United States Patent
Kay et al.

(10) Patent No.: US 9,889,620 B2
(45) Date of Patent: Feb. 13, 2018

(54) DEVICES AND METHODS FOR THE PRODUCTION OF MICROFIBERS AND NANOFIBERS

(71) Applicant: CLARCOR Inc., Franklin, TN (US)

(72) Inventors: Stephen Kay, Austin, TX (US);
Thomas D. Carr, Lakeway, TX (US);
Carlos Barocio, Tamps (MX); Joe Moore, Austin, TX (US)

(73) Assignee: CLARCOR Inc., Franklin, TN (US)

( * ) Notice: Subject to any disclaimer, the term of this patent is extended or adjusted under 35 U.S.C. 154(b) by 992 days.

(21) Appl. No.: 13/960,389

(22) Filed: Aug. 6, 2013

(65) Prior Publication Data

US 2014/0035179 A1 Feb. 6, 2014

Related U.S. Application Data

(60) Provisional application No. 61/680,109, filed on Aug. 6, 2012, provisional application No. 61/776,054, filed on Mar. 11, 2013.

(51) Int. Cl.
| | |
|---|---|
| *D01D 5/18* | (2006.01) |
| *B29D 99/00* | (2010.01) |
| *B29C 47/00* | (2006.01) |
| *B29C 47/12* | (2006.01) |
| *B29C 47/30* | (2006.01) |
| *C03B 37/04* | (2006.01) |

(52) U.S. Cl.
CPC ........... *B29D 99/0078* (2013.01); *D01D 5/18* (2013.01); *B29C 47/0014* (2013.01); *B29C 47/122* (2013.01); *B29C 47/30* (2013.01); *C03B 37/04* (2013.01); *C03B 37/045* (2013.01)

(58) Field of Classification Search
CPC .... B29D 99/0078; D01D 5/18; C03B 37/045; C03B 37/04; B29C 47/30; B29C 47/122; B29C 47/0014
See application file for complete search history.

(56) References Cited

U.S. PATENT DOCUMENTS

| | | | |
|---|---|---|---|
| 3,622,293 | A | 11/1971 | Firnhaber |
| 3,928,009 | A | 12/1975 | Perry |
| 6,141,992 | A | 11/2000 | Gross et al. |
| 2014/0339717 | A1* | 11/2014 | Peno .................. D01D 5/18 264/6 |

FOREIGN PATENT DOCUMENTS

| | | |
|---|---|---|
| EP | 0 801 040 A2 | 10/1997 |
| WO | WO 91/13836 A1 | 9/1991 |
| WO | WO 2005/061763 A1 | 7/2005 |
| WO | WO 2007/089710 A1 | 8/2007 |

* cited by examiner

*Primary Examiner* — Robert J Grun
(74) *Attorney, Agent, or Firm* — Reinhart Boerner Van Deuren P.C.

(57) ABSTRACT

Described herein are apparatuses and methods of creating fibers, such as microfibers and nanofibers, that include additives that modify one or more properties of the produced fibers. The methods discussed herein employ centrifugal forces to transform material into fibers. Apparatuses that may be used to create fibers are also described. Fiber producing devices with features that enhance fiber production and adaptability to different types of fiber are described.

24 Claims, 16 Drawing Sheets

DEVICES AND METHODS FOR THE PRODUCTION OF MICROFIBERS AND NANOFIBERS

PRIORITY CLAIM

This application claims the benefit of U.S. Provisional Application No. 61/680,109 filed on Aug. 6, 2012 and U.S. Provisional Application No. 61/776,054 filed on Mar. 11, 2013, both of which are incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

Described herein are apparatuses and methods of creating fibers, such as microfibers and nanofibers. The methods discussed herein employ centrifugal forces to transform material into fibers.

In an embodiment, a device for use in a microfiber and/or nanofiber producing system includes: a substantially circular body, wherein a diameter of the body varies between a top surface of the body and a bottom surface of the body, an internal cavity disposed in the body, wherein the internal cavity receives material to be produced into a fiber, one or more openings that allow material to be passed from the internal cavity to the exterior of the body; and a coupling member, wherein the body is couplable to a driver through the coupling member. During use rotation of the body causes material in the body cavity to be passed through one or more openings and ejected from one or more material outlets to produce microfibers and/or nanofibers.

In an embodiment, a system for producing microfibers and/or nanofibers includes: a fiber producing device comprising a body, the body comprising one or more openings, and a coupling member, wherein the body is configured to receive material to be produced into a fiber; one or more temperature sensors disposed within the body or on a surface of the body; a driver capable of rotating the body, wherein the body is couplable to the driver through the coupling member; a shaft coupling the body to the drive; and a rotary electric device coupled to the shaft and electrically coupled to the sensors and a power source, wherein the rotary electric coupling provides and receives electrical signals to and from one or more of the temperature sensors while the fiber producing device is being rotated. During use rotation of the body causes material in the body to be passed through one or more openings to produce microfibers and/or nanofibers.

In an embodiment, a device for use in a microfiber and/or nanofiber producing system includes: a sidewall member, wherein one or more openings extend through the sidewall; a bottom member; and a top member; wherein the top member comprises a coupling member; and wherein the top member, the bottom member, and sidewall member define an internal cavity of the body, and wherein the sidewall is removable from the body. The body is configured to receive material to be produced into a fiber, and wherein the body is couplable to a driver through the coupling member. During use, rotation of the body causes material in the body to be passed through one or more openings to produce microfibers and/or nanofibers.

BRIEF DESCRIPTION OF THE DRAWINGS

Advantages of the present invention will become apparent to those skilled in the art with the benefit of the following detailed description of embodiments and upon reference to the accompanying drawings, in which.

Figure 1A:
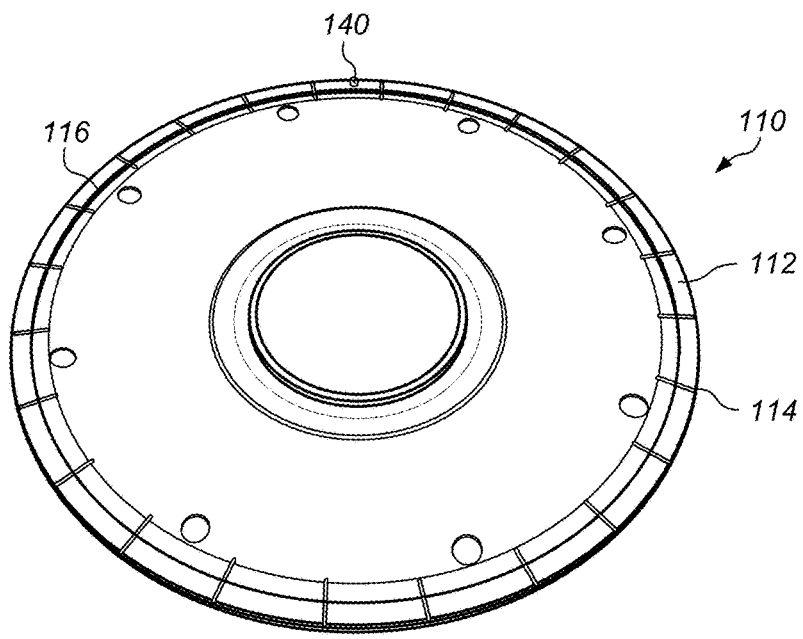
FIGS. 1A-C depict an embodiment of a fiber producing device.
Figure 1B:
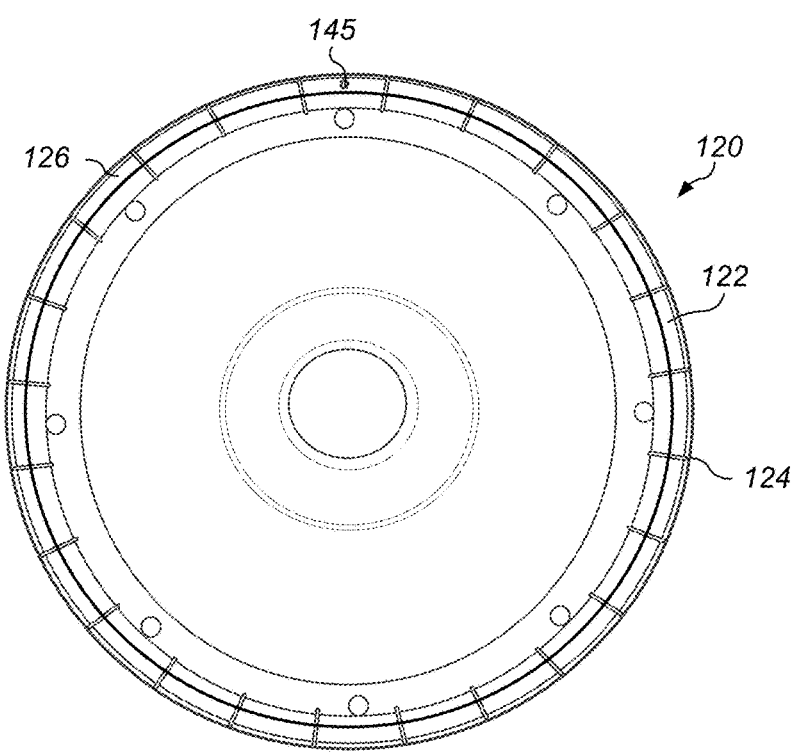
Figure 1C:
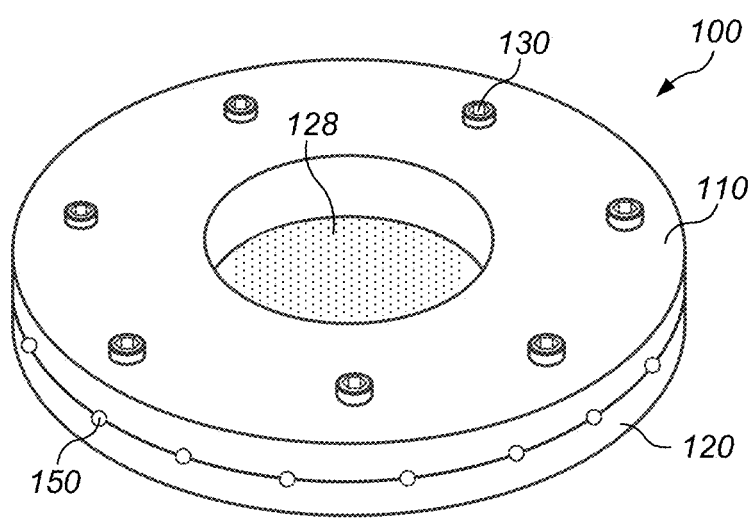

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; 2009/0280207 entitled "Superfine Fiber Creating Spinneret and Uses Thereof" to Lozano et al.; 2012/0292810 entitled "Apparatuses Having Outlet Elements and Methods for the Production of Microfibers and Nanofibers" to Peno; 2012/0294966 entitled "Multilayer Apparatuses and Methods for the Production of Microfibers and Nanofibers" to Peno et al.; 2012/0295021 entitled "Apparatuses and Methods for the Deposition of Microfibers and Nanofibers on a Substrate" to Peno et al.; 2012/0292795 to entitled "Apparatuses and Methods for Simultaneous Production of Microfibers and Nanofibers" to Peno et al.; 2012/0304613 entitled "Split Fiber Producing Devices and Methods for the Production of Microfibers and Nanofibers" to Peno et al.; and 2012/0292796 entitled "Devices and Methods for the Production of Coaxial Microfibers and Nanofibers" to Peno et al.; all of which are incorporated herein by reference.

Figure 3A:
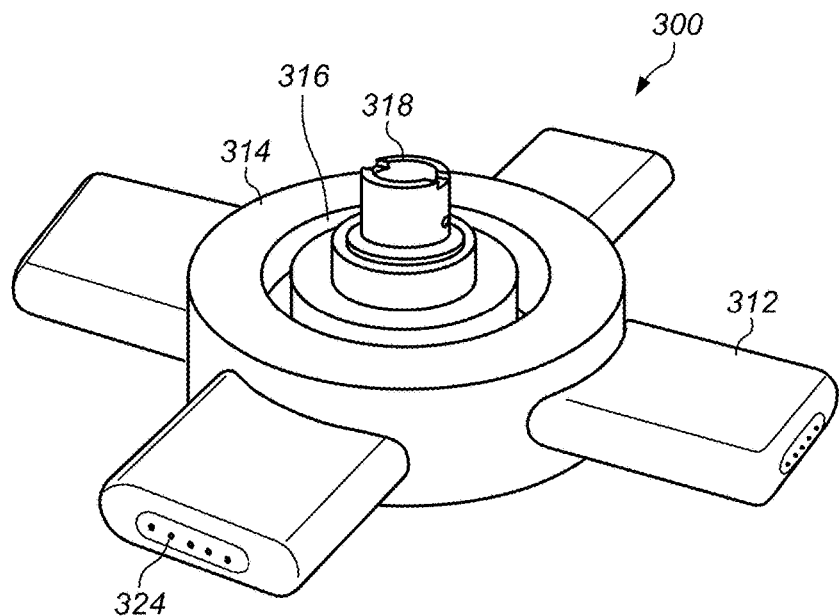
FIG. 3A depicts an embodiment of a body of a fiber producing device with four external draft members.
Figure 3B:
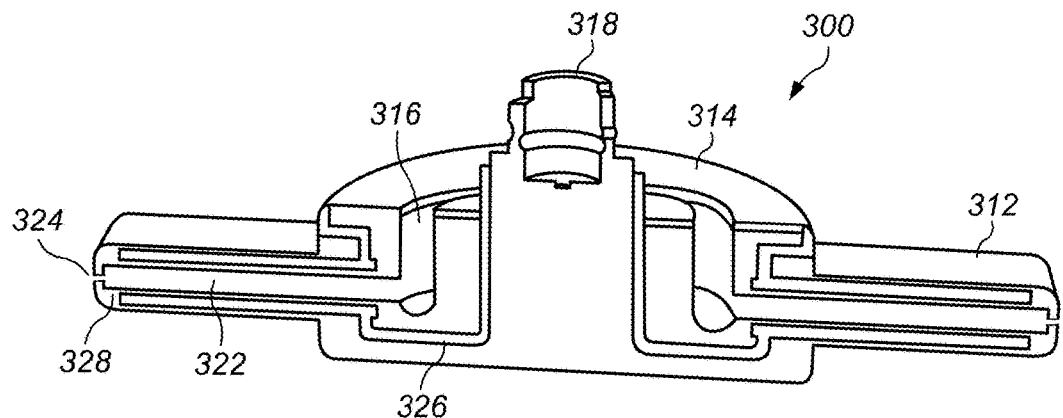
FIG. 3B depicts a cross section of an embodiment of a body of a fiber producing device with four external draft members.

One embodiment of a fiber producing device is shown in FIGS. 3A-C. Fiber producing device 100 includes a body comprising a first member 110 (FIG. 38A) and a second member 120 (FIG. 38B). First member 110 includes a first member coupling surface 112. First member coupling surface 112 includes one or more grooves 114 extending along the width of the first member coupling surface. Second member 120 includes a second member coupling surface 122 and a coupling member 128. Second member coupling surface 122 comprises one or more grooves 124 extending along the width of the second member coupling surface. Coupling member 128 may be used to couple the body to a driver of a fiber producing system.

The body is formed by coupling first member 110 to second member 120. To couple the first and second members, first member coupling surface 112 is contacted with second member coupling surface 122. One or more fasteners 130 may be used to secure the first member and second member together. When the first member coupling surface is coupled to the second member coupling surface to form the body, the first member and the second member together define an internal cavity of the body. In one embodiment, fasteners 130 have an effect on the pattern of fiber produced by the fiber producing device. For example, the head of a fastener produces external gas currents due to the high speed of rotation of the fiber producing device. Additional components may be added on either side of the body or incorporated directly onto the surface of the body to produce external gas currents. These external gas currents can effect the pattern of fibers produced. The pattern of fibers produced by the fiber producing device may be altered by using fasteners having different head configurations. Alternatively, the position of fasteners may be altered to change the fiber deposition pattern. For example, the one or more fasteners may be left out of existing holes. Alternatively, the body may include a plurality of holes. The pattern of fibers produced by the fiber producing device may be altered by changing which of the plurality of holes are used to couple the first and second members together. In another embodiment. The height of the fasteners may be altered by loosing and or tightening the fasteners. Thus the height of the head of one or more fasteners may be varied to alter the pattern of fibers produced by the fiber producing device.

In some embodiments, it is desirable that grooves 114 of the first member are substantially aligned with groves 124 of the second member. When the grooves are aligned, the grooves together form one or more openings 150 extending from the interior cavity to an outer surface of the body. During use, rotation of the body material disposed in the internal cavity of the body is ejected through one or more openings 150 to produce microfibers and/or nanofibers. Material may be placed into the body of fiber producing through a first member opening 128 formed in first member 110. In one embodiment, first member is ring shaped and material is added to the internal cavity through a central opening of the ring shaped first member.

In order to ensure proper alignment of the first member with the second member, the first member may include a first alignment element 116 disposed on the first coupling member surface 112. The second member may include a second alignment element 126 disposed on the second member coupling surface 122. First alignment element 116 couples with second alignment element 126 when first member 110 is properly aligned with second member 120. This may help to ensure that grooves 114 and 124 are properly aligned. In one embodiment, one of the first or second alignment elements includes a projection extending form the coupling surface, and the other of the first or second alignment elements includes an indentation complementary to the projection.

In an embodiment, the first alignment element may be a first alignment ring 116 disposed on the first coupling member surface 112. The second member may include a second alignment ring 126 disposed on the second member coupling surface 122. First alignment ring 116 interlocks with second alignment ring 126 when first member 110 is properly aligned with second member 120. The interlocking first and second rings center the first member and second member with each other. In one embodiment, first and second rings interlock with each other on an angle so that the first and second members are centered to one another. Alignment is further insured by the use of a projection 140 formed in the first member which fits into a suitable indentation 145 formed in the second member. Projection 140 and indentation 145 help ensure that the first and second members are coupled in the same rotational position such that the grooves of the first and second members are aligned.

In an embodiment, where the fiber producing device is coupled to a driver positioned above the fiber producing device, the coupling member extends through the internal cavity defined by the first and second members and through the first member. Alternatively, where the fiber producing device is coupled to a driver positioned below the fiber producing device, the coupling member is coupled to an outer surface of the second member, extending away from the second member.

In some embodiments, a fiber producing device may include a body. The body may be formed such that a portion of the body may function to facilitate conveyance of produced fibers away from the body. For example, the body of a fiber producing device may include draft members which create a gas flow proximate to the fiber producing device. In some embodiments, a fiber producing device may include two or more draft members. In some embodiments, a fiber producing device may include four draft members. FIGS. 2A-B and 3A-B depict embodiments of a body of a fiber producing device with draft members. Draft members may function as blades on a fan creating a gas current. The gas current created by the draft members may facilitate movement of the produced fibers away from the fiber producing device. The gas currents may direct the produced fibers in a fiber producing system. In some embodiments, draft members may be angled out of the plane of the body of the fiber producing device. Draft members may be angled, much like blades of a fan, increasing the strength of a gas current produced by the draft members. In some embodiments, an angle of the draft members may be adjusted by a user in order to increase/decrease a strength of the gas current produced during use. Upon adjustment the draft members may be locked into place.

Figure 2A:
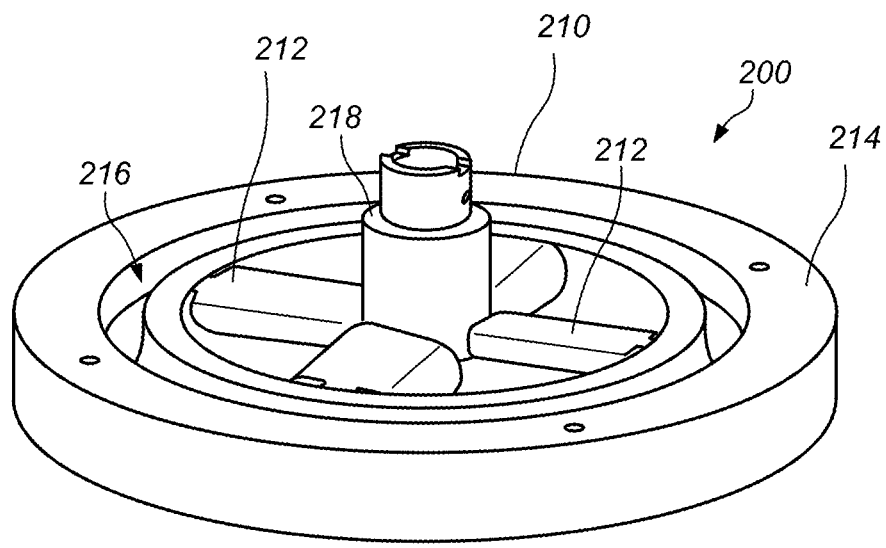
FIG. 2A depicts an embodiment of a body of a fiber producing device with four internal draft members.
Figure 2B:
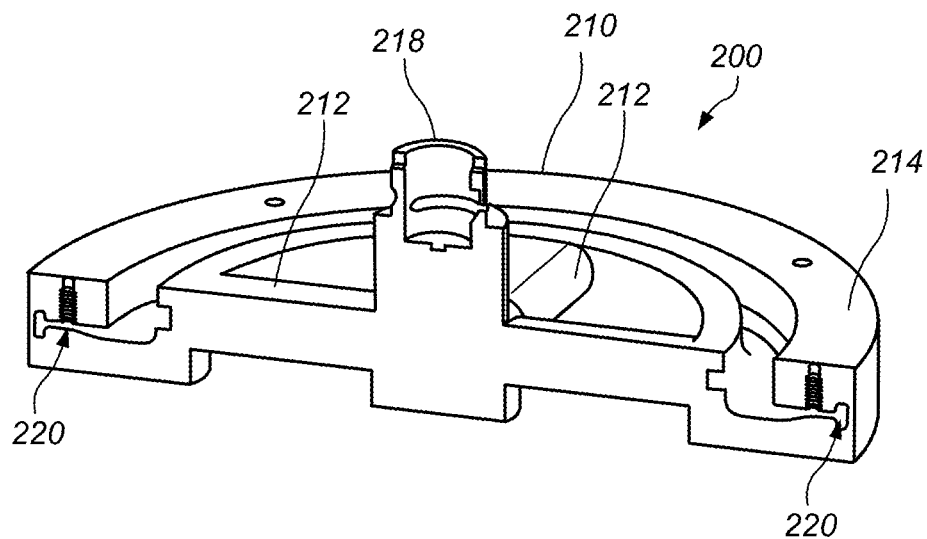
FIG. 2B depicts a cross section of an embodiment of a body of a fiber producing device with four internal draft members.

FIGS. 2A-B depict embodiments of a body of a fiber producing device 200 with draft members 212 positioned within an exterior ring portion 214 of the body of the fiber producing device. Channel 216 may function as a material input channel, wherein material is positioned in the channel before being spun out of openings in ring portion 214 and produced into fibers. As depicted in the cross section of FIG. 2B, exterior ring portion 214 may include an inclined pressure channel 220 which functions to increase the pressure of material as the material is forced out the openings in the ring portion. Inclined pressure channel 220 may include a narrowing of the channel which then widens out before the openings.

Coupling member 218 may function to couple fiber producing device 200 to a drive system of a fiber producing system. In some embodiments, a top surface of exterior ring portion 214 may be compatible with an inductive heating system.

FIGS. 3A-B depict an alternate embodiment of a fiber producing device 300 with draft members 312 positioned outside of a ring portion 314 of the body of the fiber producing device. Channel 316 may function as a material input channel, wherein material is positioned in the channel before being spun out of openings in members 312 and produced into fibers. As depicted in the cross section of FIG. 3B, draft members 312 may include a channel 322. Channels 322 may function to connect openings 324 with channel 316 to produce fibers during use. In some embodiments, the body may be formed from layers of insulating material 326 and heat transmitting material 328. Coupling member 318 may function to couple fiber producing device 300 to a drive system of a fiber producing system. In some embodiments, a top surface of exterior ring portion 314 may be compatible with an inductive heating system.

Figure 4A:
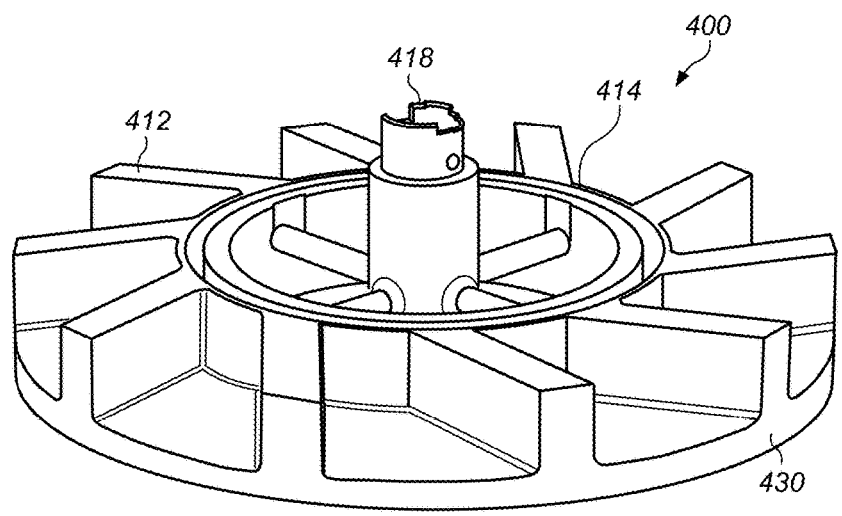
FIG. 4A depicts an embodiment of a body of a fiber producing device with a plurality of external draft members.
Figure 4B:
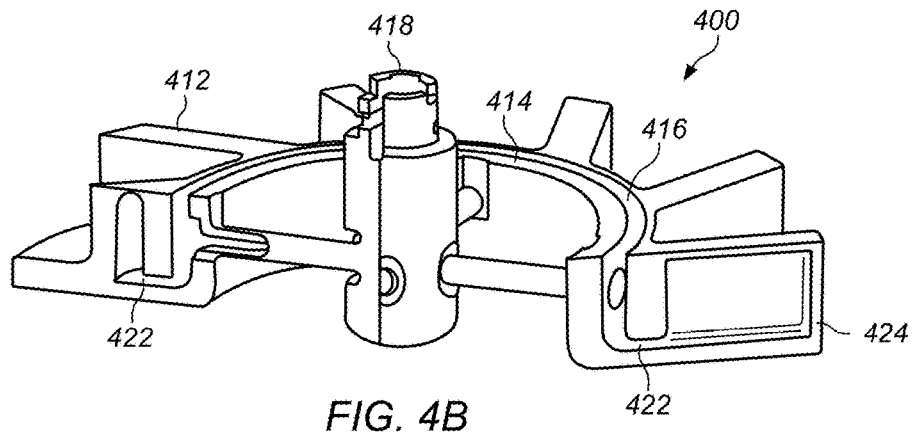
FIG. 4B depicts a cross section of an embodiment of a body of a fiber producing device with a plurality of external draft members.
Figure 4C:
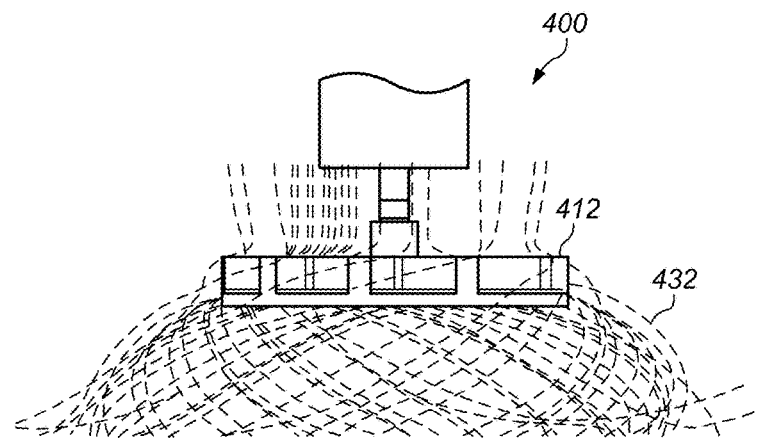
FIG. 4C depicts an embodiment of a body of a fiber producing device with a plurality of external draft members with a representation of air and/or fiber flow during use.

FIGS. 4A-C depict an alternate embodiment of a body of a fiber producing device 400 with a plurality of external draft members 412. In the depicted embodiment fiber producing device 400 includes draft members 412 positioned outside of a ring portion 414 of the body of the fiber producing device. In the depicted embodiment, draft members 412 are coupled to ring portion 414 and a support member 430. Channel 416 may function as a material input channel, wherein material is positioned in the channel (e.g., injected from a nozzle delivery system) before being spun out of openings in members 412 and produced into fibers. As depicted in the cross section of FIG. 4B, draft members 412 may include a channel 422. Channels 422 may function to connect openings 424 with channel 416 to produce fibers during use. Coupling member 418 may function to couple fiber producing device 400 to a drive system of a fiber producing system. In some embodiments, a top surface of the fiber producing device is compatible with an inductive heating system.

FIG. 4C depicts an embodiment of a body of a fiber producing device 400 with a plurality of external draft members 412 with a representation of air/fiber flow 432 during use. Draft members 412 are coupled to support member 430 forming a pattern which resembles an impeller. The plurality of support members are positioned at an angle radiating out from ring portion 414. Material may be injected into channel 416 and then flow through channels 422 in draft members 412 due to the centrifugal forces resulting from fiber producing device 400 rotating at high speeds. Material may then be ejected through openings 424 (e.g., located at the end of the draft members), resulting from the centrifugal forces, producing the fibers. The draft members produce, during use, an air current or flow which pushes the produced fibers away from fiber producing device 440 (e.g., as depicted in FIG. 4C).

Figure 5:
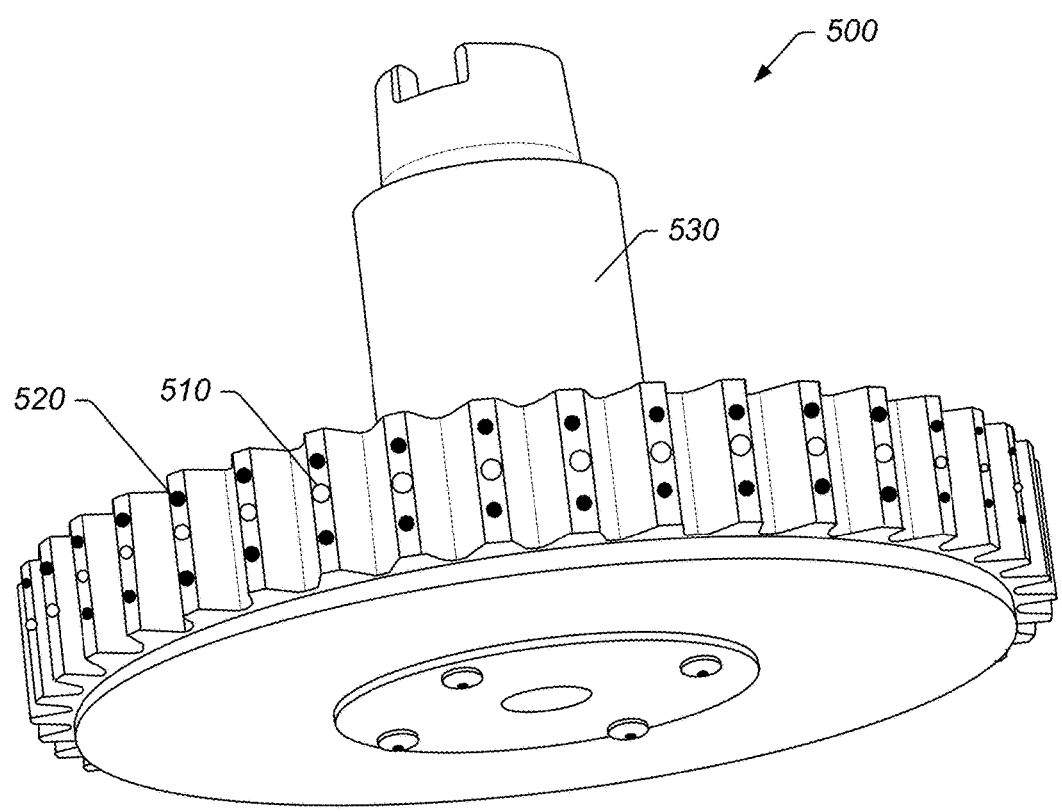
FIG. 5 depicts a perspective view of a fiber producing device comprising openings and gas outlets.

In another embodiment, a fiber producing device includes a body having one or more openings, a body cavity, and a coupling member. The body cavity is configured to receive material to be produced into a fiber. In some embodiments the body further comprising one or more gas outlets positioned proximate to the one or more openings. During use, rotation of the body causes material in the body cavity to be passed through one or more openings and ejected from one or more openings to produce microfibers and/or nanofibers, and wherein during rotation of the body, gas is passed through the gas outlets. An embodiment of a fiber producing device having such a configuration is depicted in FIG. 5. Fiber producing device 500, includes one or more openings 510 passing through the sidewalls of the body and one or more gas outlets 520 positioned proximate to one or more openings. During use, gas is ejected through one or more of the gas outlets 520, while material is ejected through one or more of the openings 510. The ejected gas can guide the ejected material away from the fiber producing device to assist with the formation of fibers. The gas outlets may be positioned above and below the openings, as depicted in FIG. 5, or may be positioned on the centerline of the fiber producing body in between openings. Gas outlets may be employed in numbers greater than 2 per opening and arranged in circular or other patterns around the openings to optimize fiber formation. In some embodiments, the gas outlet can take the form of a annulus around the orifice.

Fiber producing device 500 includes a coupling member 530 which couples the fiber producing device to a driver. Coupling member 530 may include a central conduit which extends through coupling member 530 into the body of fiber producing device 530. Central conduit may be used to introduce material directly into the body of fiber producing device 500. In some embodiments, central conduit may also include a gas inlet that allows inert gas to be passed into the fiber producing device. Central conduit may include two or more lumens which are coupled to the fiber producing device. A first lumen may be used to introduce material into the body to be converted to fibers. A second lumen may be used to pass gas into the fiber producing device. Second lumen may be coupled to a portion of the fiber producing device 500 such that gas passes into fiber producing device 500 and out through gas outlets 520, while being inhibited from entering the body which holds the material. First lumen, in a similar manner, may be coupled to a portion of the fiber producing device 500 such that material passes into the body of fiber producing device 500 and out through openings 510, while being inhibited from entering gas outlets 520. In applications that use a heated material for fiber production, gas entering the fiber producing device may be heated such that heated gas, preferably at or near the temperature of the heated material, is ejected from the fiber producing device.

Figure 6:
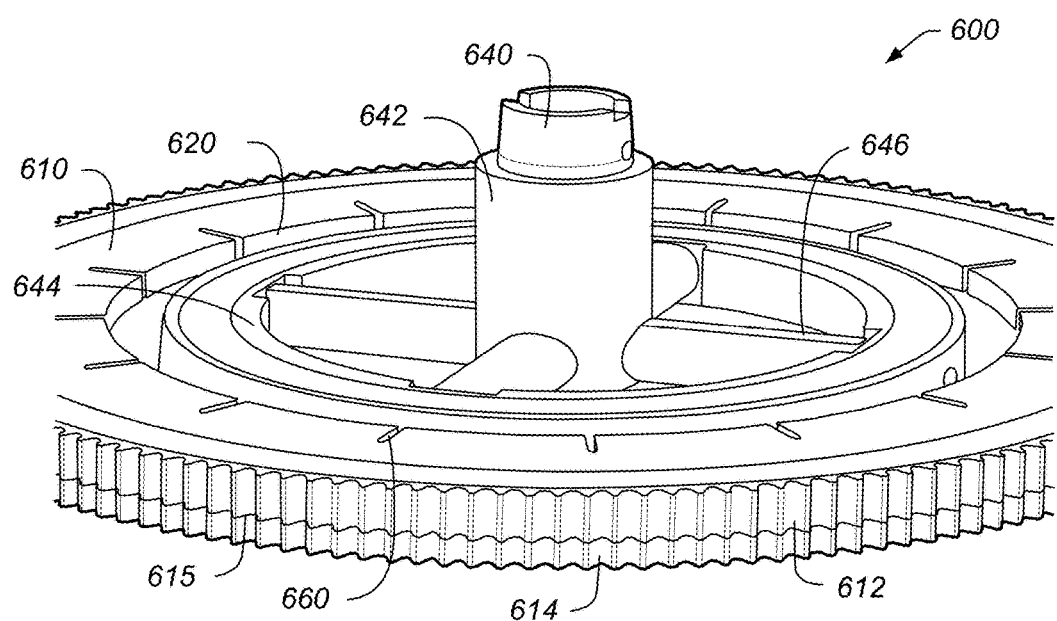
FIG. 6 depicts an alternate version of a gear fiber producing device.

FIG. 6 depicts a projection view of another embodiment of a fiber producing device. Fiber producing device 600 includes a gear like body 610, having a plurality of orifices disposed in groove 615 of each gear like extension. Body 610 may be composed of a top member 612 and a bottom member 614. When coupled together top member 612 and bottom member 614 define groove 615, which run around the circumference of the fiber producing device. Top member 612 and bottom member 614 together define a body cavity (not shown), in which the material to be formed into fibers is disposed. An opening 620 extends through top member 612 to the body cavity to allow material to be placed into body cavity. Use of a channel that couples directly to the body cavity allows introduction of the material from the top face of the body while the body is being rotated. Fiber producing device 600 is coupled to a drive using coupling member 640. Coupling member, in some embodiments, has an open hub design. An open hub design features a central coupler 642 which is connected to a coupling ring 644 through one or more arms 646, leaving a substantially empty area between the central coupler and the coupling ring. This open hub design helps improve air flow management around the fiber producing device.

Fiber producing devices may be heated by induction, as described herein. Induction produces currents in the body of the fiber producing device which heats the device. It is often desirable to control the location of the heating by steering the induced currents to the regions where heat is desired. In FIG. 6, a fiber producing device has radial slots 660 cut in the upper plate to push induced circumferential currents to the outer diameters of the device.

Figure 7A:
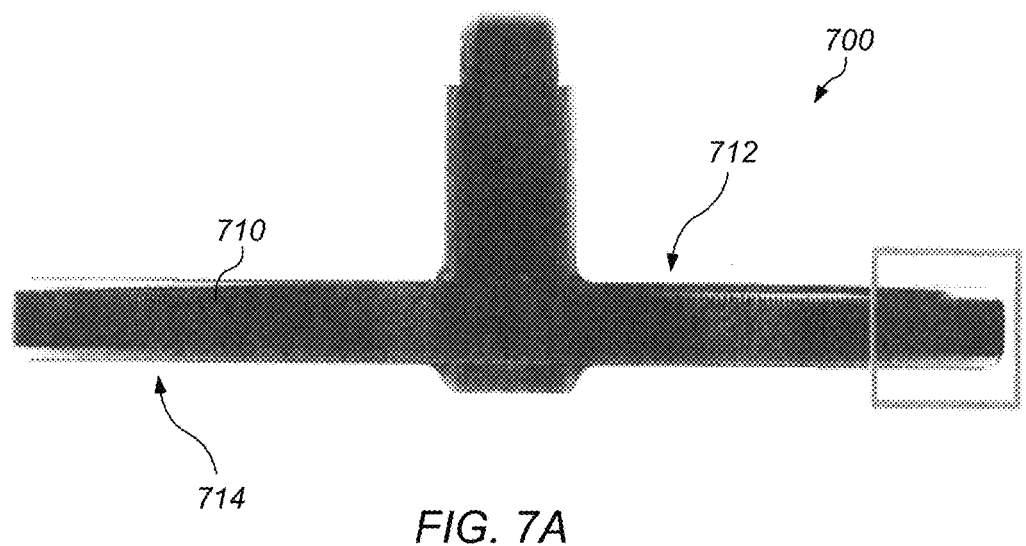
FIG. 7A depicts a fiber producing device having a diameter that varies between a top surface and a bottom surface of the body.
Figure 7B:
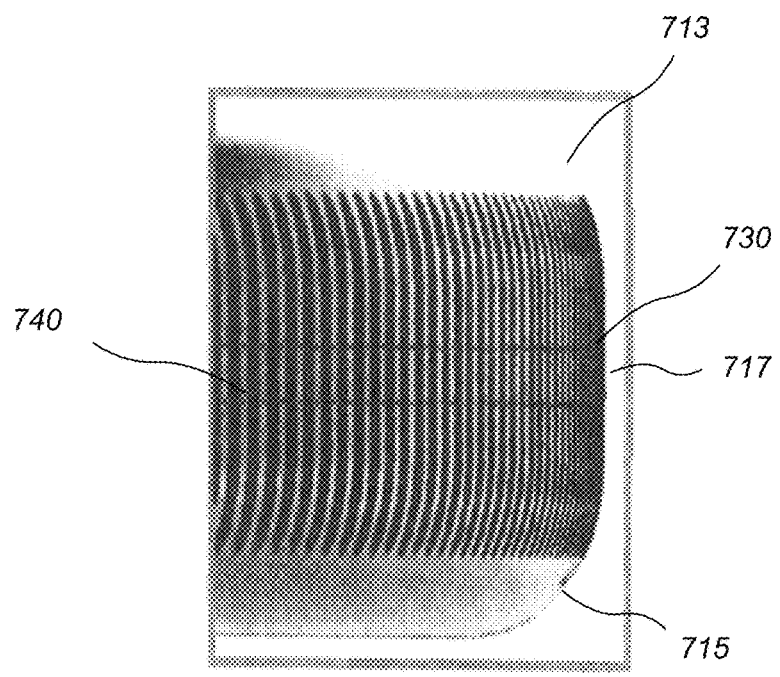
FIG. 7B depicts a close-up or a portion of the body denoted by the box in FIG. 7A.

In a fiber producing system where the fibers are laid down on a substrate perpendicular to the axis of rotation, below the fiber producing device, it is important that the spread of the fibers be controlled such that the deposited fibers are as uniform as possible across the deposition width. Several system parameters influence, and can be altered, to control the spread of fibers. For example, rotational velocity, chamber air flow, and distance between the fiber producing device and the substrate are among the system parameters than may be easily modified.

An additional parameter that may be used to modify the spread of fibers is the air flow at the openings of the fiber producing device. One way to control the air flow at the openings of a fiber producing device is to alter the shape of the body. It has been found that the body of a fiber producing device can be shaped in a way such that the air flow between the top surface and the bottom surface of the body creates different velocities in the vicinity of the openings. Thus the fiber trajectory may be controlled by changing the shape of the body. Generally, the shape of the sides of the body have the most effect on the airflow around the openings. For example, varying the diameter between the top surface and the bottom surface of the body of a fiber producing device can create different air flows proximate to the openings.

FIGS. 7A-B depict an embodiment of a fiber producing device 700. Fiber producing device 700 includes a substantially circular body 710 having an internal cavity. One or more openings 730 are formed in the sidewalls of the fiber producing device communicating with the internal cavity. Openings 730 may include two rows of openings arranged as two substantially parallel lines of openings. Both lines are spaced an equal distance from center 717 of body 710. A coupling member 720 is coupled to the body. The coupling member is used to couple body 710 to a driver.

In one embodiment, the diameter of the body varies between a top surface 712 and a bottom surface 714. In this embodiment, the body has a symmetrical profile. For example, body 710 has a rounded top portion 713 and a rounded bottom portion 715. Thus body 710 has a diameter at top portion 713 that is less than the diameter at center 717 of the body and a diameter at bottom portion 715 that is less than the diameter at center 717 of the body. The reduced diameter of the top and bottom portions of body 710 creates a predefined airflow in a region proximate to the openings. The predefined airflow enhances the movement of the fibers away from the fiber producing device in a manner that will help ensure a mote even distribution of the fibers when deposited on a substrate. The profile of fiber producing device 700 is such that central portion 717 of body 710 is substantially vertical, and lies in a line parallel with the axis of rotation. The portion of body 710 proximate to the top portion and the bottom portion may be substantially rounded to create the varying diameter for the body. Body 710 further includes a plurality of vertical grooves 740, formed in the sidewalls, the vertical grooves enhance the flow of air around the openings 730.

Figure 8A:
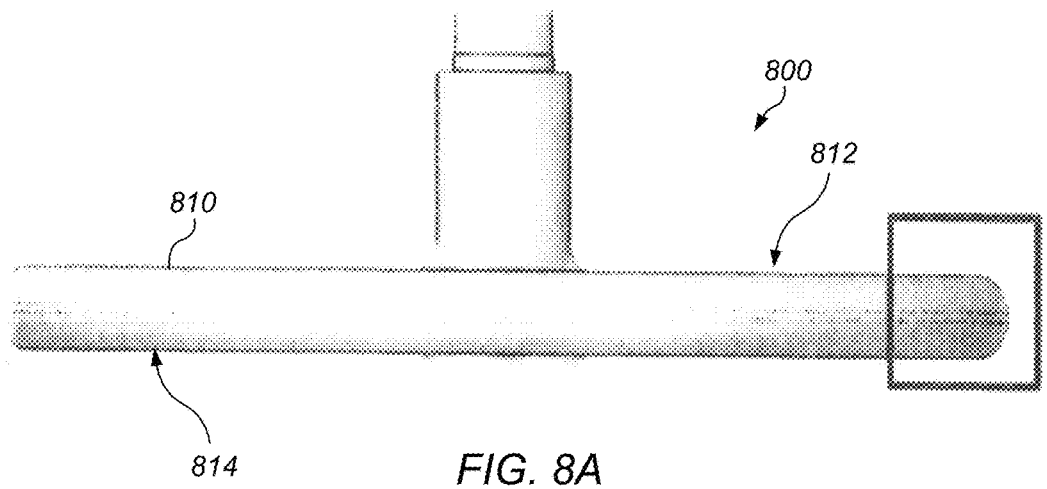
FIG. 8A depicts a fiber producing device having a rounded profile.
Figure 8B:
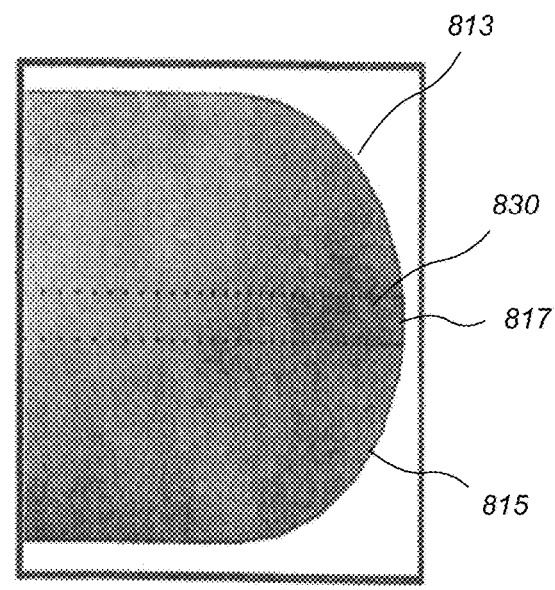
FIG. 8B depicts a close-up or a portion of the body denoted by the box in FIG. 8A.

FIGS. 8A-B depict an embodiment of a fiber producing device 800. Fiber producing device 800 includes a substantially circular body 810 having an internal cavity. One or more openings 830 are formed in the sidewalls of the fiber producing device communicating with the internal cavity. Openings 830 may include two rows of openings arranged as two substantially parallel lines of openings. Both lines are spaced an equal distance from center 817 of body 810. A coupling member 820 is coupled to the body. The coupling member is used to couple body 810 to a driver.

In one embodiment, the diameter of the body varies between a top surface 812 and a bottom surface 814. In this embodiment, the body has a symmetrical profile. For example, body 810 has a rounded top portion 813 and a rounded bottom portion 815. Thus body 810 has a diameter at top portion 813 that is less than the diameter at center 817 of the body and a diameter at bottom portion 815 that is less than the diameter at center 817 of the body. The reduced diameter of the top and bottom portions of body 810 creates a predefined airflow in a region proximate to the openings. The predefined airflow enhances the movement of the fibers away from the fiber producing device in a manner that will help ensure a mote even distribution of the fibers when deposited on a substrate. The profile of fiber producing device 800, in contrast to fiber producing device 800 (See FIG. 8), is substantially rounded from center 817 to top surface 812 and from the center to the bottom surface 814 to create the varying diameter for the body.

Figure 9A:
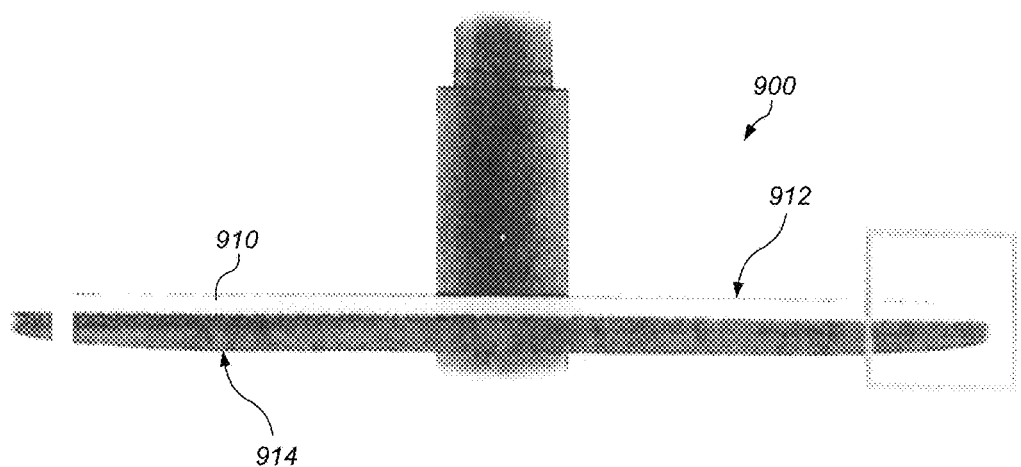
FIG. 9A depicts a fiber producing device having an asymmetric profile.
Figure 9B:
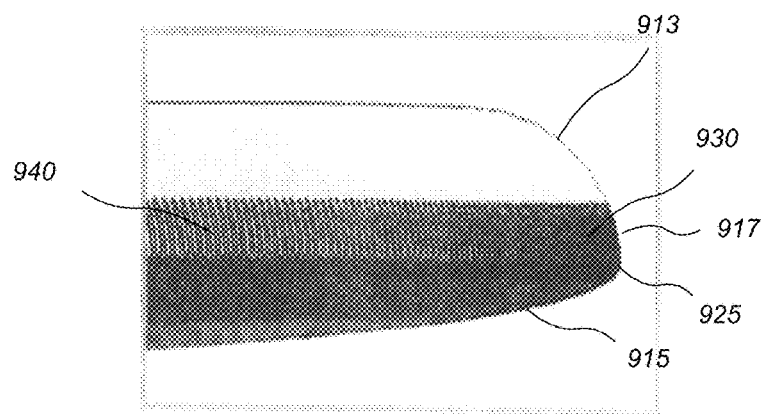
FIG. 9B depicts a close-up or a portion of the body denoted by the box in FIG. 9A.

FIGS. 9A-B depict an embodiment of a fiber producing device 900. Fiber producing device 900 includes a substantially circular body 910 having an internal cavity. One or more openings 930 are formed in the sidewalls of the fiber producing device communicating with the internal cavity. Openings 930 may include a single row of openings or two rows of openings arranged as two substantially parallel lines of openings. When two lines of openings are present, both lines are spaced an equal distance from center 917 of body 910. A coupling member 920 is coupled to the body. The coupling member is used to couple body 910 to a driver. It should be understood that two lines of openings is merely illustrative, the number of lines of openings may be two or more.

In one embodiment, the diameter of the body varies between a top surface 912 and a bottom surface 914. In this embodiment, the body has an asymmetrical profile. Body 910 has a rounded top portion 913 and a rounded bottom portion 915. Thus body 910 has a diameter at top portion 913 that is less than the diameter at center 917 of the body and a diameter at bottom portion 915 that is less than the diameter at center 917 of the body. The reduced diameter of the top and bottom portions of body 910 creates a predefined airflow in a region proximate to the openings. The predefined airflow enhances the movement of the fibers away from the fiber producing device in a manner that will help ensure a mote even distribution of the fibers when deposited on a substrate. The profile of fiber producing device 900 is asymmetrical. Thus the top portion is substantially rounded from an off center position 925 to top surface 912 and from the off center position 925 to the bottom surface 914 to create an asymmetrical profile. Body 910 further includes a plurality of vertical grooves 940, formed in the sidewalls, the vertical grooves enhance the flow of air around the openings 930.

Figure 10:
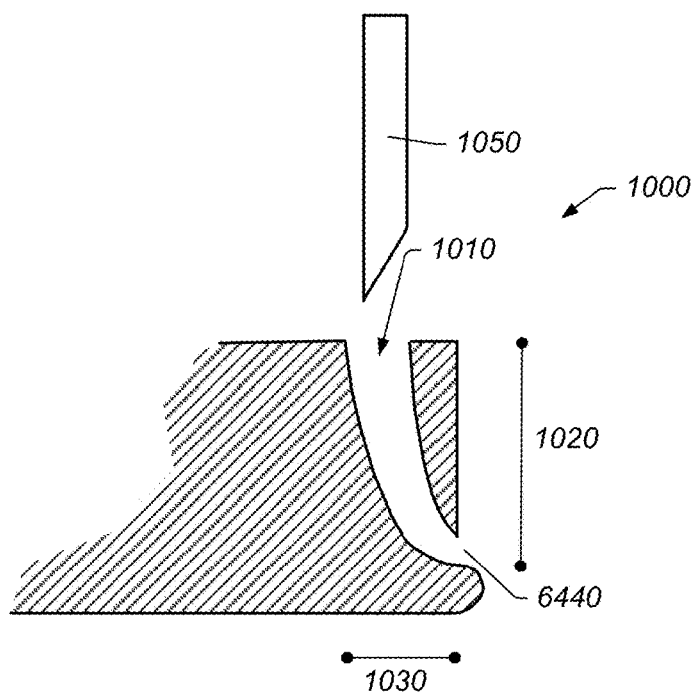
FIG. 10 depicts a cross-section view of a fiber producing body having vertical material channels.

Other modifications to fiber producing systems have been contemplated and are described below. FIG. 10 depicts a schematic cross-section view of a fiber producing device 1000. Fiber producing device 1000 includes a body channel 1010 which receives material to be produced into fibers. Body channel 1010 is configured to hold material in a vertical orientation. In one embodiment, body channel 1010 has a vertical dimension 1020 that is larger than the lateral dimension 1030 of the channel, with respect to the body. During use, material may be placed in the channel from a material transfer conduit 1050. The material disposed in channel 1010 flows substantially vertically through the body, rather than laterally as described in other fiber producing devices. The material flows through channel 1010 into one or more openings 1040 passing through a sidewall of the body. In some embodiments, channel 1010 is substantially angled toward one or more of the openings. Use of vertical channels reduced the heated volume of the fiber producing device. This leads to lower power requirements and better temperature uniformity.

Figure 11:
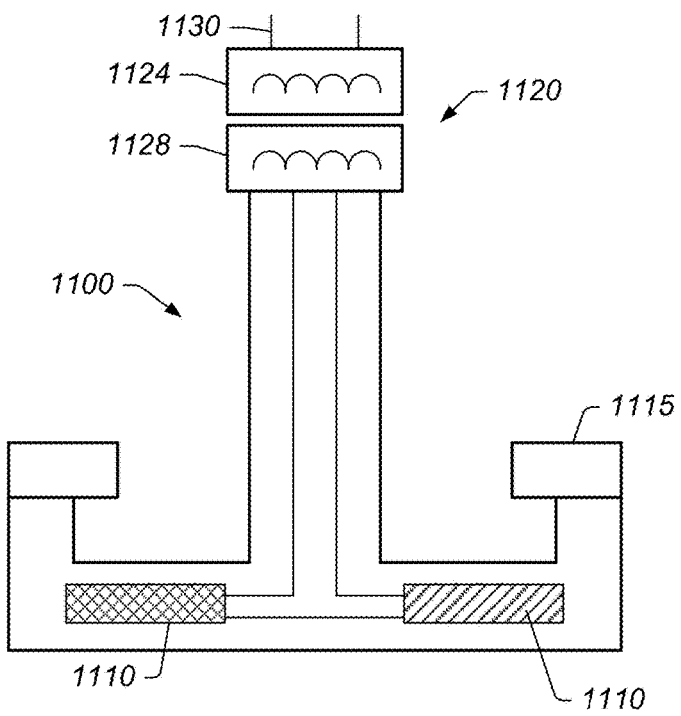
FIG. 11 depicts a cross-section view of fiber producing device that includes a rotary transformer.

In another embodiment, sensors embedded in a fiber producing device, or coupled to the surface of a fiber producing device, may be used to monitor the temperature of a fiber producing device. FIG. 11 depicts a schematic diagram of a fiber producing device 1100 having one or more sensors 1110. Sensors may be powered and transmit and receive signals by use of a rotary electric device 1120 coupled to connecting member 1130 of fiber producing device 1100. In one embodiment, rotary electric device 1120 is a rotary transformer. A rotary transformer is a transformer used to couple electrical signals between two parts that rotate in relation to each other. In an embodiment, a rotary transformer includes a primary winding 1024 and a secondary winding 1028 with each winding facing each other. Primary winding is mounted to a driver, while secondary winding is mounted to the connecting member. Suring use connecting member (and thus secondary winding) rotates with respect to the driver. Magnetic flux provides an electrical coupling from the primary winding to the secondary winding across an air gap, providing the mutual inductance that couples energy across the rotary transformer. The coupled energy is provided to the heating devices to create heat in the fiber producing body. In other embodiments, rotary electric device 1120 is a set of electrical brushes or slip rings.

Sensors 1110 may be disposed partially or entirely within a body 1115 of fiber producing device 1100. Alternatively, sensors 1110 may be positioned on an outer surface of the fiber producing device 1110.

In an embodiment, one or more sensors 1110 are temperature sensors. Temperature sensors may be used to control the temperature of the fiber producing device. In one embodiment, the temperature of a fiber producing device may be measured using temperature sensors (e.g., resistive temperature sensors, infrared temperature sensors or thermocouple temperature sensors) embedded in or disposed on a fiber producing device. The temperature sensors may be coupled to the measurement electronics through rotary electric device 1120. A reference temperature sensor may be incorporated on the sensor side to compensate for transformer changes.

Alternatively, temperature sensors may also be coupled to the measurement electronics through electrical brushes and slip rings. A reference temperature sensor may be incorporated on the sensor side to compensate for transformer changes or changes to the resistance of the slip ring contacts.

A controller may be used to maintain an operating temperature of the fiber producing device. For example, a controller may be coupled to one or more heating devices (disposed proximate to, on, or within the fiber producing device) and one or more temperature sensors (disposed proximate to, on or within the fiber producing device). During use, one or more temperature sensors may provide the controller with information regarding the temperature of the fiber producing device. The controller may access the temperature of the fiber producing device and operate the heating devices, as needed, to maintain the proper operating temperature of the fiber producing device. Use of a feedback temperature loop will help to minimize temperature variations in the fiber producing device that would affect fiber formation.

In an embodiment of a fiber producing system, a heating device may be positioned substantially inside a body of a fiber producing device. An embodiment of a fiber producing system is depicted in FIGS. 12A-D. Fiber producing system 1200 includes a fiber producing device 1210. Fiber producing device 1210 includes a body 1212 and a coupling member 1214. Body 1212 comprises one or more openings 1216 through which material disposed in the body may pass through during use. As discussed previously, interior cavity of the body may include angled or rounded walls to help direct material disposed in body 1212 toward openings 1216. In some embodiments, an interior cavity of body 1212 may have few or no angled or rounded walls to help direct material disposed in body 1212 because such angled walls are not necessary due to the material and/or the speed at which the body is spinning during the process. Coupling member 1214 may be an elongated member extending from the body which may be coupled to a driver 1218. Alternatively, coupling member may be a receiver which will accept an elongated member from a driver (e.g., the coupling member may be a chuck or a universal threaded joint).

Figure 12A:
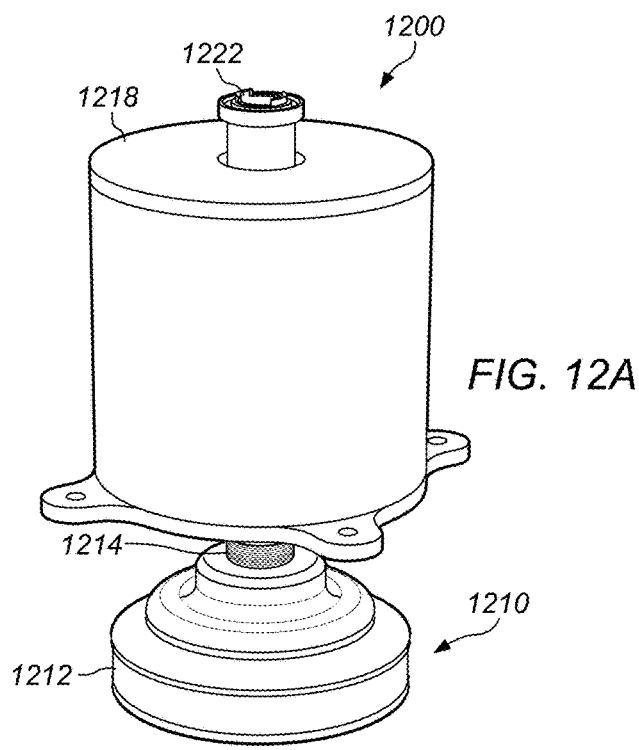
FIG. 12A depicts an embodiment of a fiber producing system with a driver mounted above the fiber producing device.
Figure 12B:
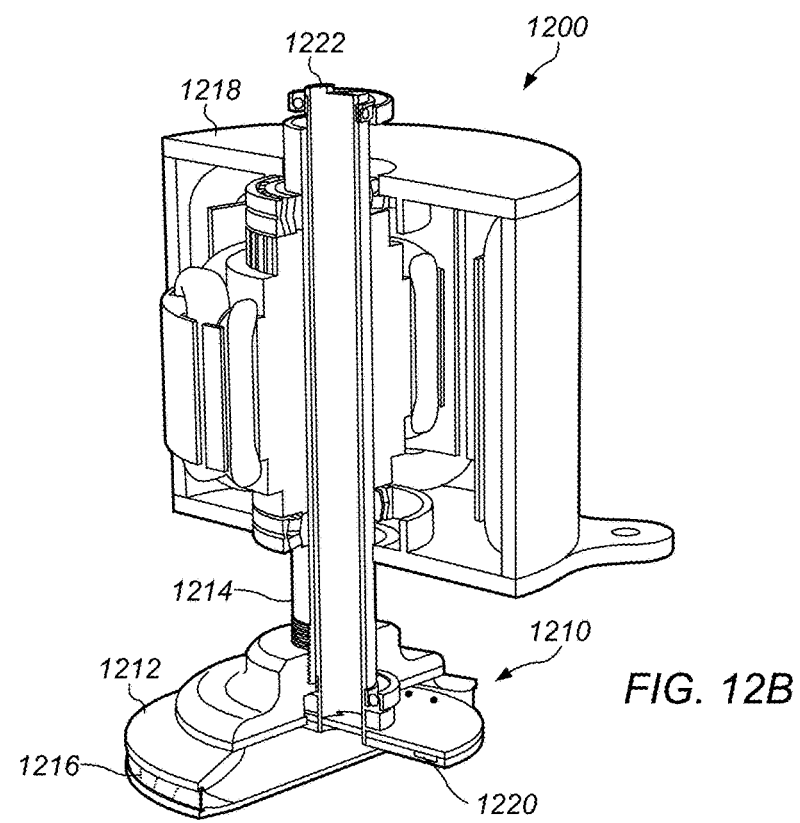
FIG. 12B depicts an embodiment of a cross section of a fiber producing system with a driver mounted above the fiber producing device.
Figure 12C:
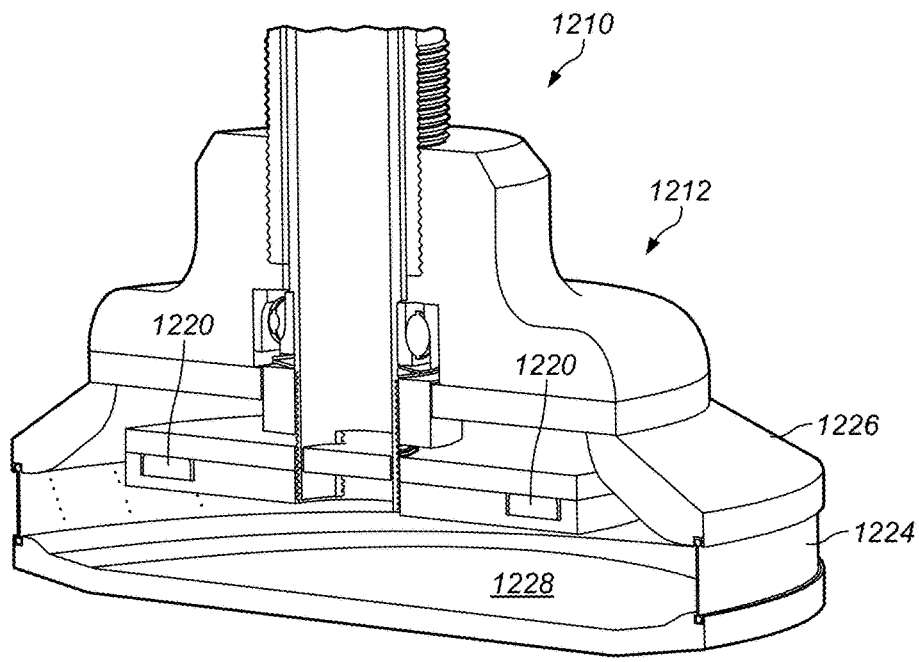
FIG. 12C depicts an embodiment of a cross section of a body of a fiber producing system.

In some embodiment, fiber producing device 1210 may include internal heating device 1220 (e.g., depicted in FIGS. 12B-C). Heating device 1220 may function to heat material conveyed into body 1212 facilitating the production of fibers as the material is conveyed through one or more openings 1216. Heating device 1220 may heat material inductively or radiantly. In some embodiments, a heating device may heat material conductively, inductively or radiantly. In some embodiments, a heating device may heat material using RF, lasers, or infrared.

In some embodiments, heating device 1220 may move during use. Heating device 1220 may move in coordination with body 1212 during use. Heating device 1220 may be coupled to coupling member 1214.

In some embodiments, heating device 1220 may remain substantially motionless in relation to body 1212 during use such that as body 1212 spins, heating device 1220 remains relatively motionless. In some embodiments, heating device 1220 may be coupled to elongated conduit 1222. Elongated conduit 1222 may be at least partially positioned in coupling member 1224. Elongated conduit 1222 may move independently of coupling member 1224 such that as the coupling member rotates body 1212 rotates without moving elongated conduit 1222. In some embodiments, elongated conduit 1222 may supply power to heating device 1220.

In some embodiments, materials used to form fibers may conveyed into a body of a fiber producing device. In some embodiments, the material may be conveyed to the body under pressure. Pressurized feed of materials into a fiber producing device may facilitate fiber production by forcing the materials through the openings in addition to the force provided by the spinning body of the device. A pressurized feed system may allow for produced fibers to be ejected from the openings at a higher velocity. A pressurized feed system may also allow for cleaning the fiber producing device by conveying gasses and/or solvents under pressure through the device to facilitate cleaning. In some embodiments, elongated conduit 1222 may function to convey materials to body 1212. Elongated conduit 1222 may in some embodiments convey materials through driver 1218 (e.g., as depicted in FIG. 12B). Conveying materials through the elongated conduit may allow for the material to be delivered in an atmosphere other than air/oxygen. Materials may be conveyed using an inert atmosphere such as argon or nitrogen.

In some embodiments, a driver may include a direct drive coupled to a body of a fiber producing device. A direct drive system may increase the efficiency of the fiber producing system. Direct drive mechanisms are typically devices that take the power coming from a motor without any reductions (e.g., a gearbox). In addition to increased efficiency a direct drive has other advantages including reduced noise, longer lifetime, and providing high torque a low rpm. Elongated conduit 1222 may in some embodiments convey materials through driver 1218 (e.g., as depicted in FIG. 12B), in some embodiments driver 1218 may include a direct driver.

Figure 12D:
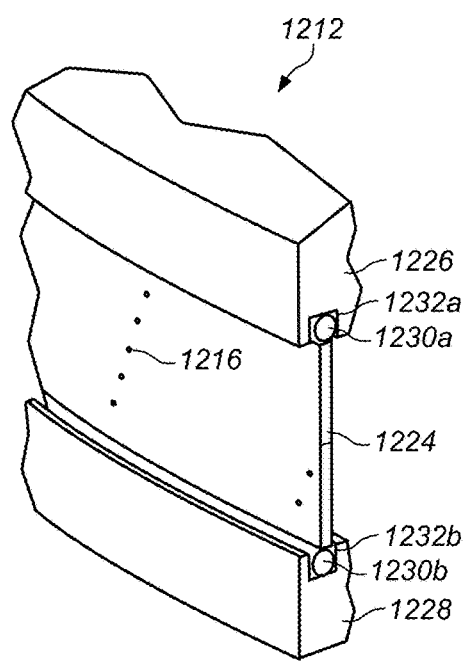
FIG. 12D depicts an embodiment of a cross section of a body of a portion of a sidewall, top member, and bottom member of a fiber producing system.

FIG. 12D depicts an embodiment of a cross section of a body 1212 of a portion of a sidewall 1224, top member 1226, and bottom member 1228 of a fiber producing system. Fiber producing system 1200 includes a fiber producing device 1210. Fiber producing device 1210 includes a body 1212 and a coupling member 1214. Body 1212 comprises one or more openings 1216 through which material disposed in the body may pass through during use. Sidewall 1224 may include a plurality of openings 1216. In some embodiments, the plurality of openings may include a patterned array of openings. The patterned array may include a repeating pattern. The pattern may be such that no opening in the pattern is aligned vertically with another opening. The pattern may be such as to include a minimum distance between openings horizontally. In some embodiments, a pattern may inhibit entwining of fibers. Inhibition of fiber entwining or "roping" may result in a more consistent fiber product and better product.

Different patterns of openings may be desired and/or one or more openings may become clogged during normal use. In some embodiments, sidewall 1224 of body 1212 may be replaced without having to replace any other components of a fiber producing device. Sidewall 1224 may be couplable to top member 1226, and bottom member 1228 of a fiber producing system. Edges 1230a and 1230b of a sidewall may fit within channels 1232a and 1232b of top member 1226 and bottom member 1228 respectively. Edges 1230 may function to couple sidewall 1224 to top member 1226 and bottom member 1228. In some embodiments, the edges of the sidewall may form a friction fit with the channels of the top and bottom members. In some embodiments, the edges of the sidewall may have a cross section similar to a cross section of the channels of the top and bottom members such that the edges may slide into the channels in a lateral direction but inhibited from being pulled out of the channels in any other direction.

In an embodiment, a heating device used to heat a fiber producing device is a radiant heater. An infrared heater is an example of a radiant heater that may be used to heat a fiber producing device. In some embodiments, a heating device may include an infrared heating device. An infrared heating device may include a device which is tuned or tunable to a specific infrared wavelength. An infrared wavelength may be chosen based upon what type of material is being heated.

Infrared radiant heating is used extensively in industry, particularly for drying of materials or fusing of coatings (e.g., powder coating, drying of paints or printed layers). Infrared heating has advantages over other forms of heating, in that the emitted radiation (if appropriately specified) is only absorbed by the substrate (or treated portions of the substrate) and not by the surrounding air or objects. Infrared heating may be defined as applying radiant energy to the part surface by direct transmission from an emitter (source). Some of the energy emitted may be reflected off the surface, some may be absorbed by the substrate and some may be transmitted though the substrate. The absorption characteristics may depend on the type of material, the colour, and the surface finish. For example, a rough, black object will absorb more infrared energy than will a smooth white object which reflects more energy. The actual behavior of infrared energy depends on the wavelength, the distance between the substrate and the emitter, the mass of the part, the surface area and the color sensitivity. Generally shorter wavelength infrared radiation penetrates further into the substrate but is more sensitive to changes in the color of the substrate. Generally speaking, polymers absorb more effectively in the medium infrared range.

When radiation is applied to a polymer surface it can be reflected, transmitted, or absorbed. It is the absorbed portion that leads to temperature increase and consequently leads to melting of the polymer. The amount of radiation absorbed by a pure unfilled thermoplastic is determined by the vibrations of its atoms. For a vibration to be infrared-active, it must be associated with a change in dipole moment which can be activated by the oscillating electric field of incident infrared radiation. Certain vibrational modes have frequencies within the infrared spectrum and can therefore absorb infrared radiation of specific wavelengths. Plastic materials absorb infrared radiation at wavelengths from about 2 to about 15 µm. Wavelengths of 3.3 to 3.5 µm correspond to vibrational modes of C—H bonds; alcohol, carboxylic acid, or amide groups absorb infrared energy at wavelengths of about 2 to about 3 µm. Absorption of infrared radiation induces molecular vibrations (e.g., stretching, rocking, etc.) which increase the temperature of the organic polymer. Infrared heating device therefore may have several advantages including restricting heating energy to the desired material. In this way less energy is wasted during the heating process because it is directed towards a specific material.

In some embodiments, a heating device (e.g., an infrared heating device) may be positioned to heat materials before and/or as they enter the body of a fiber producing device. In some embodiments, an infrared heating device may be positioned at least partially in the interior of a fiber producing device. In such embodiments, an infrared heating device may heat material conveyed through a body of the fiber producing device. The infrared heating device may function to heat the material such that the material melts such that when the body spins the material passes through openings in the body to produce fibers. The infrared heating device may further heat material in the body which was previously melted prior to introduction into the body. The infrared heating device may further heat material in the body which was previously melted prior to introduction into the body. Further heating material may function to decrease the viscosity of the material. Further heating material may function to decrease the viscosity of the material such that flowing of the material through the openings is facilitated.

In some embodiments, an infrared heating system may be used to heat at least a portion of the environment substantially adjacent to a body of the fiber producing device. Specifically the infrared heating system may be used to heat at least a portion of the environment substantially adjacent to a plurality of openings in the body through which the material is conveyed in order to produce the fibers. Heating the environment around the body of the fiber producing device may allow for longer fibers to be produced by extending the quench rate of fibers exiting the openings in the body of the fiber producing device. By adjusting the infrared heating device one may adjust a length of the fibers produced by the fiber producing device.

Figure 13:
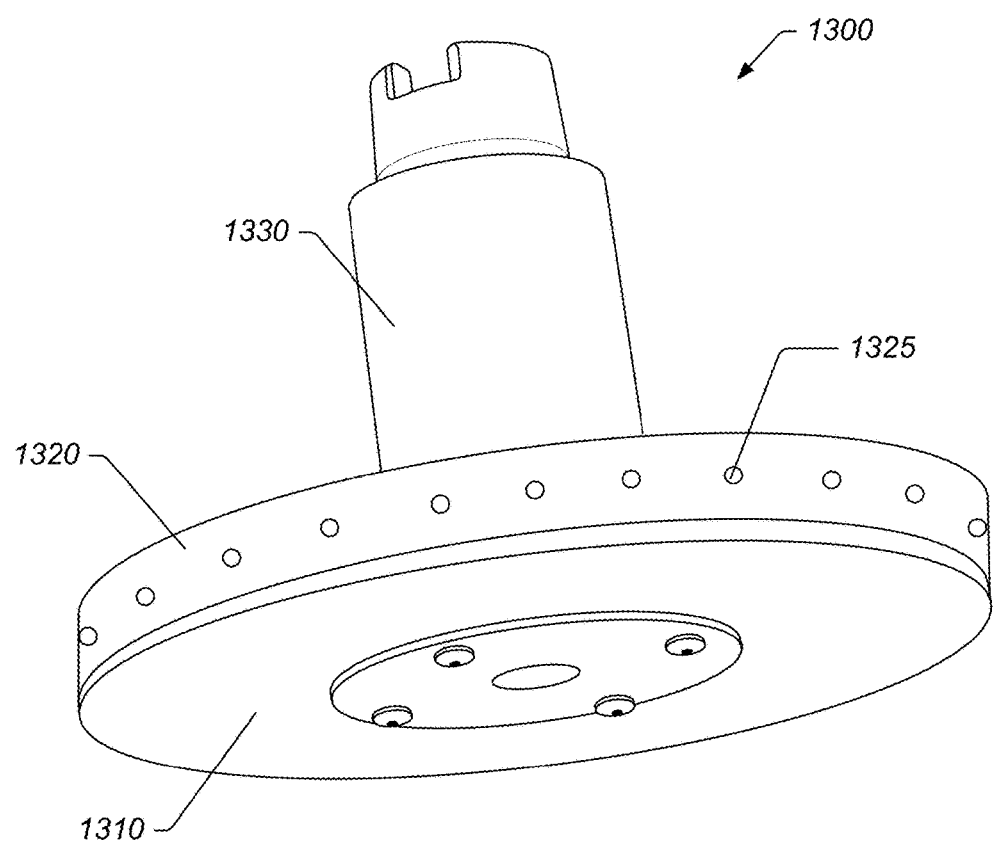
FIG. 13 depicts a perspective view of a fiber producing device having a band.

An embodiment of a fiber producing device comprising a band coupled to a body is depicted in FIG. 13. Fiber producing device 1300, includes a body 1310, a band 1320, and a coupling member 1330. Band 1320 includes one or more openings 1325 passing through the sidewalls of the band. During use, rotation of the body causes material in the body cavity to be passed through one or more openings of the band and ejected from one or more openings to produce microfibers and/or nanofibers. Band 1320 may be formed from any suitable material including metals (e.g., stainless steel) and polymers. The material used to from the band may be selected to be compatible with the material being processed and the processing method (e.g., hot melt, or solution based applications). In some embodiments, band 1320 is removably coupled to body 1320. Band 1320 may be easily removed from the body and replaced with a replacement band having the same or different configuration of openings (e.g., different size or pattern of openings). In this manner, fiber producing device 1300 may be customized for different applications by simply replacing band 1320. In another embodiment, openings formed in band 1320 may be altered by placing grommets in the openings. A grommet may have a shape that allows it to be fitted within the opening to alter the size of the opening. Generally, a grommet may be used to reduce the size of one or more openings. In this manner, a single band may be customized by use of grommets to alter the size of one or more of the openings.

Figure 14:
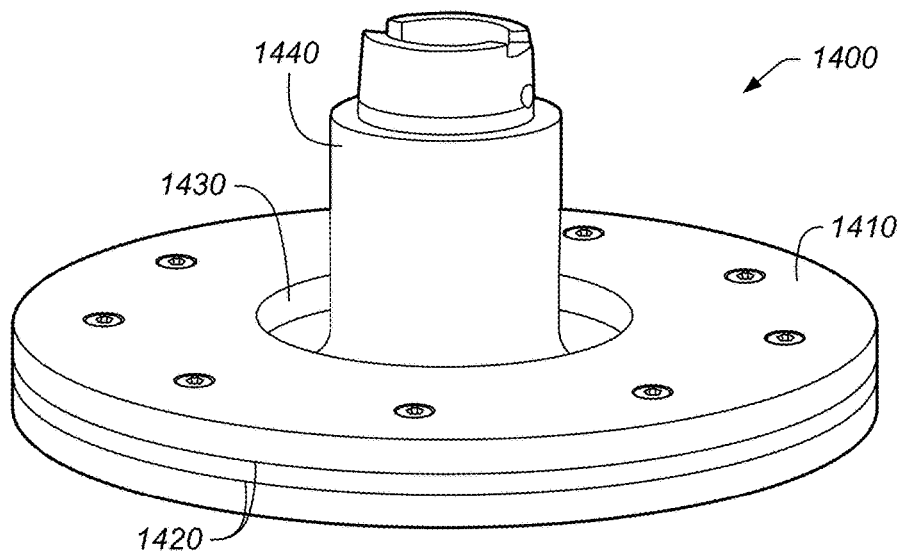
FIG. 14 depicts an alternate embodiment of a fiber producing device.
Figure 15:
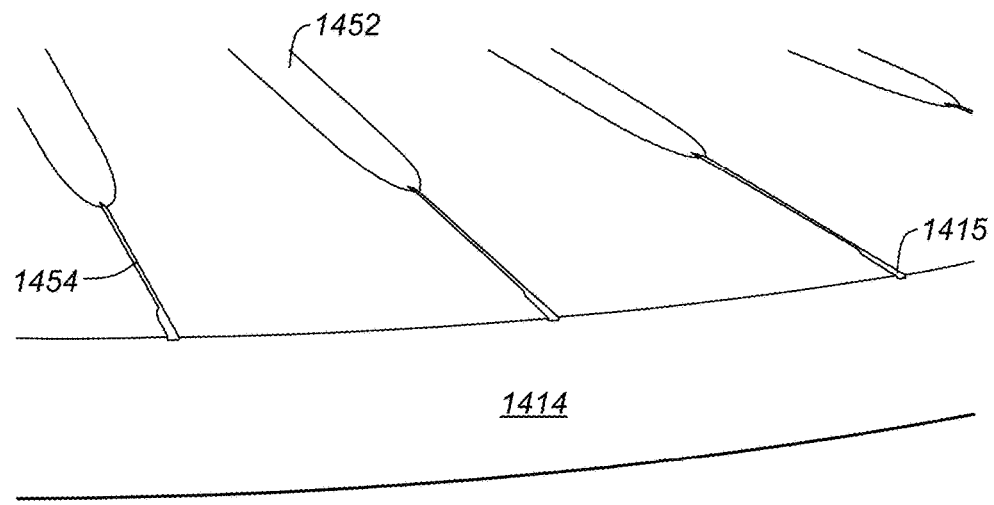
FIG. 15 depicts a close-up view of a groove of the fiber producing device depicted in FIG. 78.
Figure 16:
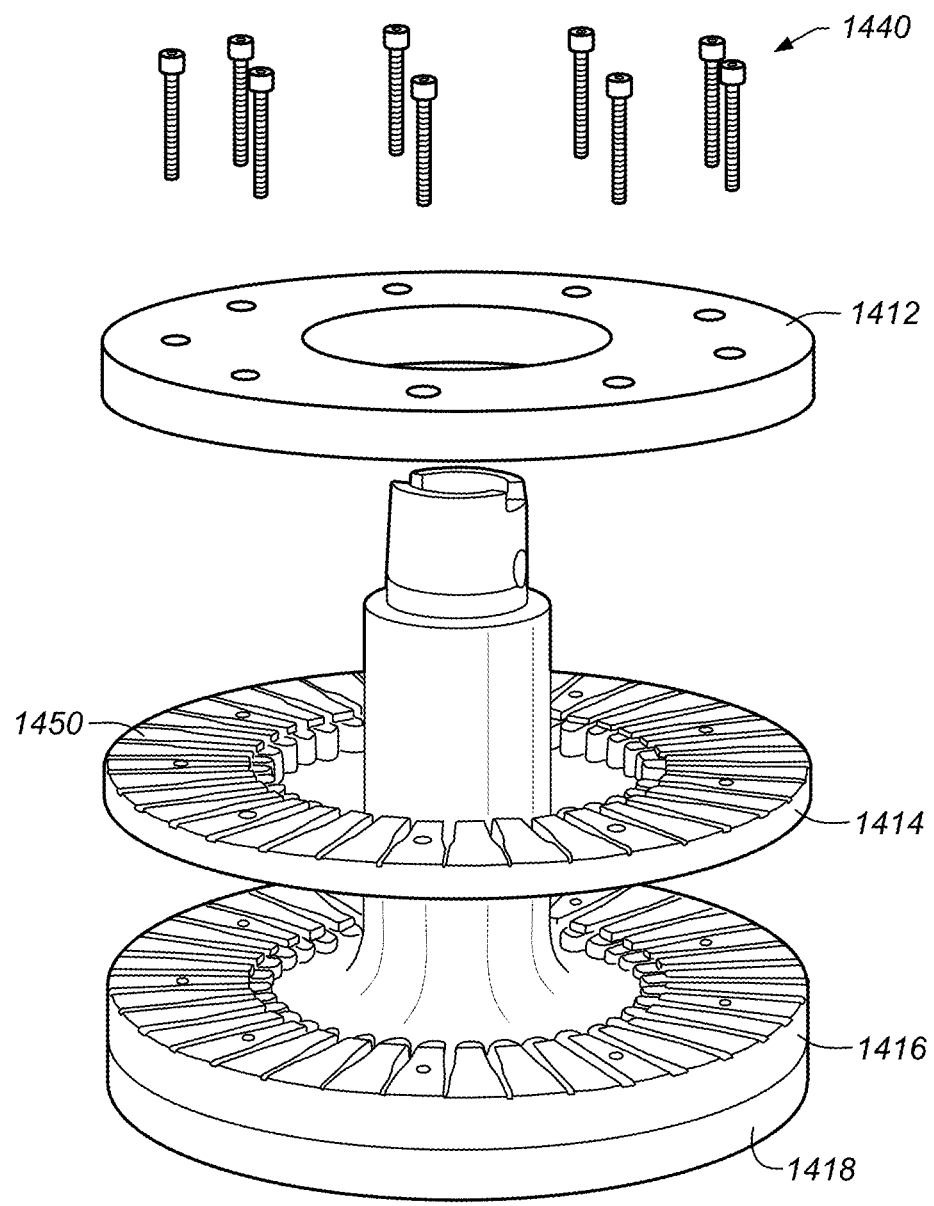
FIG. 16 depicts an exploded view of the fiber producing device of FIG. 78.

FIGS. 14-16 depict an alternate embodiment of a fiber producing device. Fiber producing device 1400 includes a body 1410, having a plurality of orifices disposed in slot 1420. Body 1410 may be composed of two or more members. In the embodiment depicted a grooved member 1414 is placed on grooved support 1418. Support 1418 provides a base upon which the grooved members may be stacked. Support 1418 also includes a coupling member 1430 which may be used to couple fiber producing device 1400 to a driver. While two grooved members are depicted, it should be understood that more or less grooved members may be used.

In one embodiment, fiber producing device 1400 includes a top member 1412 and a support member 1418 with one or more grooved members (1414, 1416) sandwiched between the top member and the support member. To assemble fiber producing device 1400, a first grooved member 1416 is placed on support 1418. A seal (not shown) may be disposed between grooved member 1416 and support 1418. A second grooved member 1414 is placed on first grooved member 1416. A seal (not shown) may be disposed between second grooved member 1414 and first grooved member 1416. When coupled together first grooved member 1416 and second grooved member 1414 define slot 1420, which runs around the circumference of the fiber producing device. Top member 1412 is placed on second grooved member 1414 and is fastened to support member 1418 by fasteners 1440, which extend through the top member, first, and second groove members into the support member. A seal (not shown) may be disposed between top member 1412 and second grooved member 1414. When coupled together top member 1412 and second grooved member 1414 define a slot 1420, which runs around the circumference of the fiber producing device.

When fiber producing device 1400 is assembled, a body cavity 1430 is defined by support member 1418, grooved members 1416 and 1414, and top member 1412. Material may be placed into body cavity 1460 during use. A plurality of grooves 1450 are formed in grooved members 1414 and 1416. When fiber producing device 1400 is rotated, material disposed in body cavity 1460 enters grooves 1450, which transports the material through the fiber producing device to be ejected through openings at slot 1420.

FIG. 15 depicts a close up projection view of grooves 1450. In an embodiment, a groove 1450 includes a first channel 1454 and a second channel 1415, which is narrower than the first channel. In an embodiment, when the fiber producing device is assembled, first channel 1454 forms a capillary tube that extends through the side wall of the fiber producing device. The material flows through the first channel capillary tube into the second channel 1415, which acts as a trough extending from the first channel. In some embodiments, second channel 1415 is a semi-circular channel that is not sealed by another portion of stacked fiber producing device 1400. Referring back to FIG. 14, slot 1420 represents a region of fiber producing device 1400 in which second channels 1415 reside. Having a wider, open, second channel 1415 positioned next to a capillary like first channel 1454 removes the hold-back forces (e.g., non-slip condition at a wall) from a portion of the material as it exits the opening. Furthermore, the wide, open, second channel 1415 causes the material to accelerate while still in contact with the hot metal of the fiber producing device. This allows the material (especially a hot melt stream) to thin out as it accelerates, giving a smaller effective nozzle diameter, when the material leaves the fiber producing device.

In some embodiments, a hydrophobic coating may be formed on the surface of an internal cavity of a fiber producing device. The hydrophobic coating may inhibit the deposition of hydrophilic material on the surface of the internal cavity. Likewise, a hydrophilic coating may be used to protect the surface of an internal cavity of a fiber producing device that is being used to form hydrophobic fibers.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning. Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 0.5 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or ceramic oxides (e.g., PVP with germanium/palladium/platinum).

The fibers that are created may be, for example, one micron or longer in length. For example, created fibers may be of lengths that range from about 1 µm to about 50 cm, from about 100 µm to about 10 cm, or from about 1 mm to about 1 cm. In some embodiments, the fibers may have a narrow length distribution. For example, the length of the fibers may be between about 1 µm to about 9 µm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for clean up. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for use in a microfiber and/or nanofiber producing system, the device comprising:
    a substantially circular body having a convex outer radial surface defining a sidewall located radially offset from a rotational axis of the body, wherein the sidewall has a height that extends axially be a top surface and a bottom surface, the top surface being axially offset from the bottom surface parallel to the rotational axis, the sidewall being curved for at least 75% of the height and wherein the body is symmetrical relative to a center plane that is orthogonal to the rotational axis of the body and axially between the top surface and the bottom surface;
    an internal cavity disposed in the body, wherein the internal cavity receives material to be produced into a fiber,
    one or more openings that allow material to be passed from the internal cavity to the exterior of the body;
    a coupling member, wherein the body is couplable to a driver through the coupling member for rotating the body about the rotational axis; and
    wherein, during use, rotation of the body causes material in the body cavity to be passed through one or more openings and ejected from one or more material outlets to produce microfibers and/or nanofibers.

2. The device of claim 1, wherein the shape of the body creates a predefined airflow in a region proximate to the openings.

3. The device of claim 1, wherein the diameter of the sidewall proximate to the top surface of the body is less than the diameter of the sidewall proximate to the center plane.

4. The device of claim 1, wherein the diameter of the sidewall proximate to the bottom surface of the body is less than the diameter of the sidewall proximate to the center plane.

5. The device of claim 1, wherein the diameter of the sidewall proximate to the top surface of the body is less than the diameter of the sidewall proximate to a center of the body, and wherein the diameter of the sidewall proximate to the bottom surface of the body is less than the diameter of the sidewall proximate to the center of the body.

6. The device of claim 1, wherein the diameter of the sidewall proximate to the top surface of the body is different than the diameter of the sidewall proximate to the bottom surface of the body, such that the body has an asymmetrical profile relative to a center of the body.

7. The device of claim 1, wherein the openings are arrange as two substantially parallel lines of openings, wherein both lines are spaced an equal distance from the center plane.

8. The device of claim 1, further comprising a plurality of vertically extending grooves, formed in the sidewall, wherein the plurality of vertically extending grooves are configured to alter the flow of a gas proximate to the openings.

9. The device of claim 1 wherein the profile of the sidewall is substantially rounded.

10. The device of claim 1, wherein a central portion of the sidewall is substantially vertical, and wherein a portion of the sidewall proximate to the top and/or bottom surface of the body are substantially rounded.

11. A system for producing microfibers and/or nanofibers comprising:
    a fiber producing device comprising:
        a substantially circular body having a convex outer radial surface defining a sidewall located radially offset from a rotational axis of the body, wherein the sidewall has a height that extends axially between a top surface and a bottom surface, the top surface being axially offset from the bottom surface parallel to the rotational axis, the sidewall being curved for at least 75% of the height and wherein the body is symmetrical relative to a center plane that is orthogonal to the rotational axis of the body and axially between the top surface and the bottom surface;
        an internal cavity disposed in the body, wherein the internal cavity receives material to be produced into a fiber, one or more openings that allow material to be passed from the internal cavity to the exterior of the body; and a coupling member, wherein the body is couplable to a driver through the coupling member for rotating the body about the rotational axis;

a driver capable of rotating the fiber producing device, wherein the fiber producing device is couplable to the driver through the coupling member;

wherein, during use, rotation of the fiber producing device causes material in the body to be passed through one or more openings to produce microfibers and/or nanofibers.

12. The system for producing microfibers and/or nanofibers of claim 11, wherein the body of the fiber producing device is asymmetrical relative to a center of the sidewall.

13. The system for producing microfibers and/or nanofibers of claim 11, wherein the body of the fiber producing device is symmetrical relative to a center of the sidewall.

14. A method of producing microfibers and/or nanofibers, comprising:
placing material in the fiber producing device of claim 1;
rotating the fiber producing device, wherein rotation of the fiber producing device causes material in the body to be passed through one or more of the openings to produce microfibers and/or nanofibers; and
collecting at least a portion of the produced microfibers and/or nanofibers.

15. The method of claim 14, further comprising:
heating the material to a temperature sufficient to at least partially melt the material;
heating the fiber producing device to a temperature at or near a temperature sufficient to at least partially melt the material; and
conveying the heated material into the heated fiber producing device.

16. The method of claim 14,
further comprising:
placing material in a fiber producing device; and
heating the fiber producing device to a temperature at or near the temperature sufficient to at least partially melt the material disposed in the fiber producing device.

17. The method of claim 14, further comprising mixing the material with a solvent to produce a mixture of the material in a solvent, and introducing the mixture into the fiber producing device.

18. The method of claim 14, further comprising placing a substrate on a substrate support positioned below the fiber producing device.

19. A device for use in a microfiber and/or nanofiber producing system, the device comprising:
a substantially circular body having a convex outer radial surface defining a sidewall located radially offset from a rotational axis of the body, wherein the sidewall has a height that extends axially between a top surface and a bottom surface, the to surface being axially offset from the bottom surface parallel to the rotational axis, and a plurality of vertically extending grooves extend along the entire height of the sidewall and wherein the body is symmetrical relative to a center plane that is orthogonal to the rotational axis of the body and axially between the top surface and the bottom surface;
an internal cavity disposed in the body, wherein the internal cavity receives material to be produced into a fiber,
one or more openings that allow material to be passed from the internal cavity to the exterior of the body;
a coupling member, wherein the body is couplable to a driver through the coupling member for rotating the body about the rotational axis; and
wherein, during use, rotation of the body causes material in the body cavity to be passed through one or more openings and ejected from one or more material outlets to produce microfibers and/or nanofibers.

20. The system for producing microfibers and/or nanofibers of claim 19, wherein the body of the fiber producing device is asymmetrical relative to a center of the sidewall.

21. The system for producing microfibers and/or nanofibers of claim 19, wherein the body of the fiber producing device is symmetrical relative to a center of the sidewall.

22. A device for use in a microfiber and/or nanofiber producing system, the device comprising:
a substantially circular body having a convex outer radial surface defining a sidewall, located radially offset from a rotational axis of the body wherein the sidewall has a plurality of radial extensions defining vertical grooves angularly therebetween, each radial extension having an outer radial periphery having a material opening that allows material to be passed from the internal cavity to the exterior of the body and a gas outlet that allows gas to be passed from the internal cavity to the exterior of the body and wherein the body is symmetrical relative to a center plane that is orthogonal to the rotational axis of the body and axially between the top surface and the bottom surface;
an internal cavity disposed in the body, wherein the internal cavity receives material to be produced into a fiber,
a coupling member, wherein the body is couplable to a driver through the coupling member for rotating the body about the rotational axis; and
wherein, during use, rotation of the body causes material in the body cavity to be passed through one or more openings.

23. The device for use in the microfiber and/or nanofiber producing system of claim 22, having a second gas outlet, wherein the material opening is vertically positioned between the first gas outlet and the second gas outlet.

24. The device for use in the microfiber and/or nanofiber producing system of claim 22, wherein each radial extension only has a single material opening.

* * * * *

UNITED STATES PATENT AND TRADEMARK OFFICE
CERTIFICATE OF CORRECTION

PATENT NO. : 9,889,620 B2
APPLICATION NO. : 13/960389
DATED : February 13, 2018
INVENTOR(S) : Stephen Kay et al.

It is certified that error appears in the above-identified patent and that said Letters Patent is hereby corrected as shown below:

In the Claims

Claim 1, Column 23, Line 63:
The word "be" should correctly read --between--

Claim 19, Column 25, Line 57:
The word "to" should correctly read --top--

Signed and Sealed this
Third Day of April, 2018

Andrei Iancu
*Director of the United States Patent and Trademark Office*